J. M. LONG.
DEVICE FOR CONTROLLING AIR BRAKES OF RAILWAY VEHICLES AND ELECTROMOTIVE ENGINES.
APPLICATION FILED MAY 6, 1907.
916,737.
Patented Mar. 30, 1909.
2 SHEETS—SHEET 1.
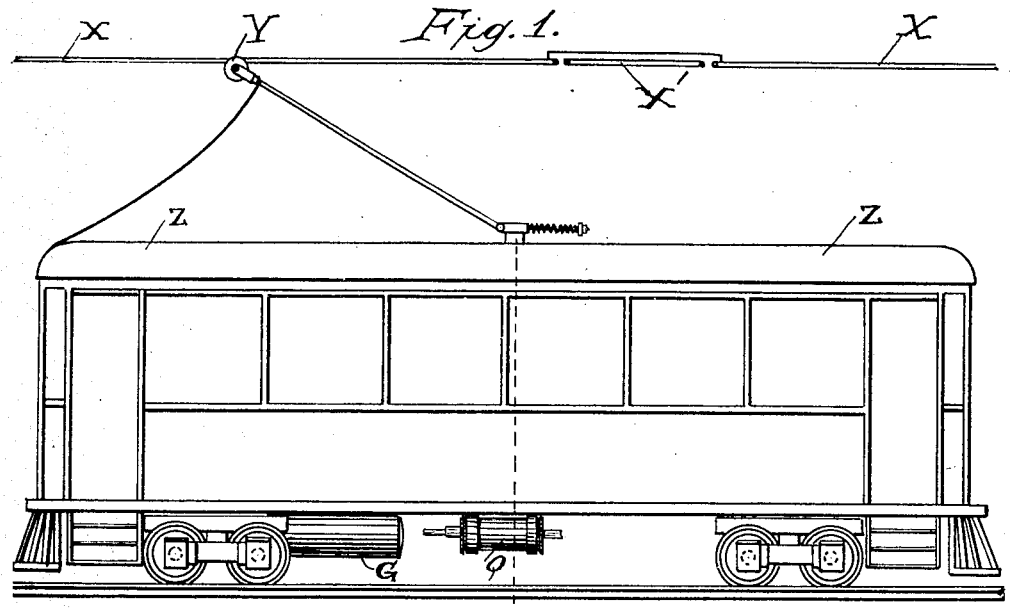
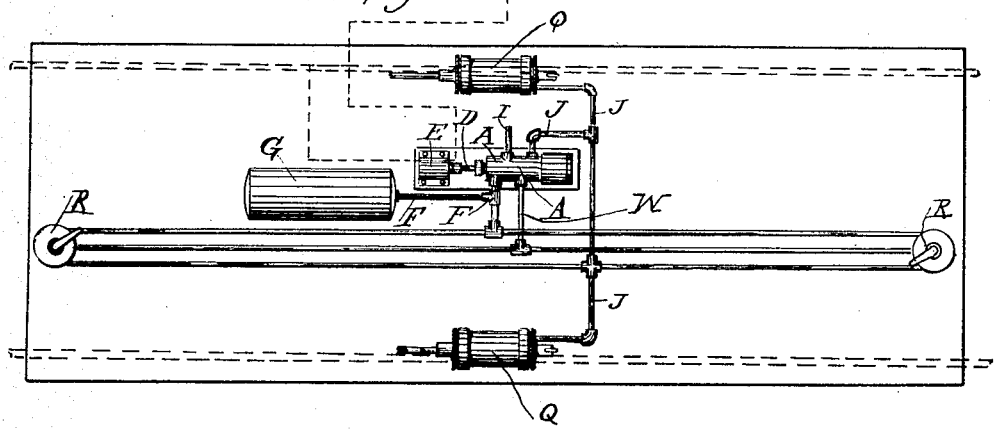
WITNESSES:
INVENTOR
Jacob Michael Long
BY S<sup>t</sup> John Day
ATTORNEY

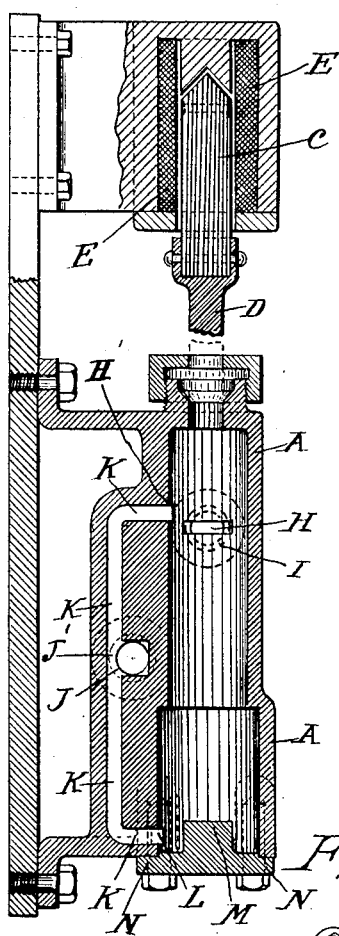
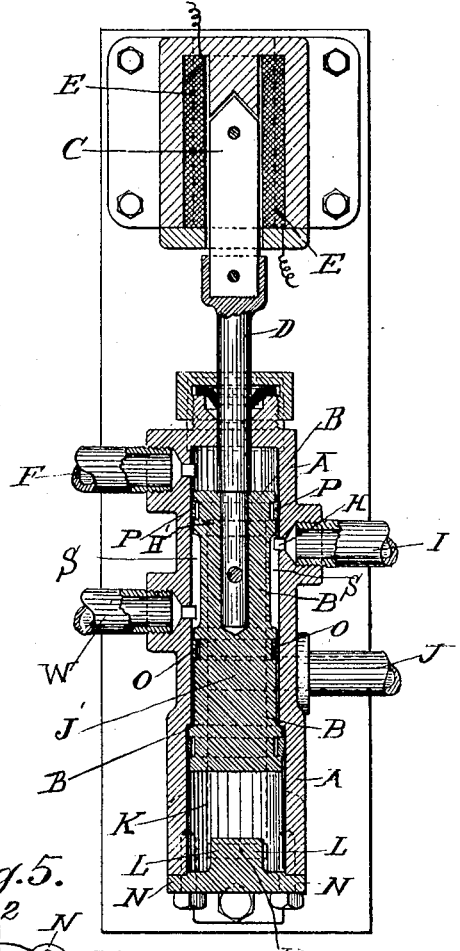
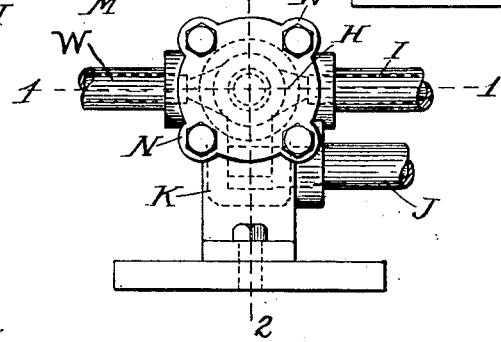

UNITED STATES PATENT OFFICE.

JACOB MICHAEL LONG, OF LOS ANGELES, CALIFORNIA.

DEVICE FOR CONTROLLING AIR-BRAKES OF RAILWAY-VEHICLES AND ELECTROMOTIVE ENGINES.

No. 916,737.      Specification of Letters Patent.      Patented March 30, 1909.

Application filed May 6, 1907. Serial No. 372,281.

*To all whom it may concern:*

Be it known that I, JACOB MICHAEL LONG, of the city of Los Angeles, in the county of Los Angeles, in the State of California, have invented a new or Improved Device for Controlling Air-Brakes of Railway-Vehicles and Electromotive Engines, of which the following is a full, clear, and exact specification, reference being had to the annexed drawings and to the letters marked thereon.

The air brake controlling device constituting my present invention is designed for being used more especially in connection with electrical railways operated by continuous current, and it has for its object to effect the automatic bringing into and out of action the compressed air brakes with which such electrically operated cars and electromotive engines are supplied.

My present invention operates electrically to put on the pressure in the air brake cylinder, or cylinders whenever a car or electromotive engine is arrested in its motion, or ceases to be propelled on a continuous current electrical railway, through the motors of a car or electromotive engine ceasing to receive current from either an overhead wire or third rail conductor of said railway, by reason of any separated portion of such conductor becoming deënergized by the automatic opening of any of the switches or interrupters therein set forth, so that the apparatus constituting my present invention is to be viewed as bringing about the complete gradual arrestment of travel of a car by the operation of the air brakes being made to electrically coöperate with such deënergizing separate portions of the overhead wire or third rail.

My controlling device may be placed in any convenient position in or upon a car or other vehicle, or in or upon an electromotive engine whose motors are operated by the continuous current of an electrical railway wherein the operating circuit consists in part of an overhead wire or of a third rail.

The special function of the apparatus constituting my present invention is to automatically turn on the air into the brake cylinder or cylinders, from the air reservoir, and to regulate the pressure with which the compressed air acts upon the piston in the brake cylinder, or pistons in the brake cylinders, according to the arrangement of the air brake which my present invention is operatively applied to, to cause the application of the brake shoes or blocks to act upon the wheels of a railway car or electromotive engine, at such time or instant when the trolley wheel or contact shoe of a railway car or electromotive engine traveling upon the track of an electrical railway operated by continuous current meets and is in contact with the section of overhead wire or third rail which has become deënergized by reason of the opening of a switch.

The electrically operated air controller is so connected by pipes leading from the air brake apparatus already in use on electrical railway cars, and electromotive engines, as not to interfere with the ordinary operation of the brakes by the hand operated valves for admitting compressed air into and releasing it from the air brake cylinders, namely, the valves on the pipes at either end of the car.

Upon the annexed drawings, Figure 1, is a side elevation of an electrical railway car and an overhead circuit, the latter having a separate portion thereof energized and deënergized by solenoid apparatus. Fig. 2, is a plan of the apparatus constituting my present invention, shown as applied below the floor of the railway car in Fig. 1, and constructed with the compressed air cylinders of an air brake, such as any of the compressed air cylinders in use. Fig. 3, is a vertical section on an enlarged scale on the line *l, l,* Fig. 5, of the device which I use in combination with the existing piston and cylinder air brake systems. Fig. 4, is a vertical section of the solenoid coil, and the cylinder wherein the piston attached to the soft iron core of the solenoid operates. Fig. 5, is an inverted plan of the lower end of the apparatus shown at Figs. 3, and 4.

The air controller consists of a cylinder A, preferably of brass, within which a long piston B, Fig. 3, operates, as hereinafter described. The ends of the piston B, are of different areas, and the upper end thereof is connected to the soft iron core C, of a solenoid by means of the rod and coupler D, also preferably of brass. When the solenoid coil E, is excited, it holds the piston B, of the air controller in a condition of inoperativeness, but open by the pipe F, to the compressed air reservoir G, shown in the plan Fig. 2. So long as the trolley wheel Y, of the car Z, is in contact with the energized portions of the overhead wire circuit X, or the shoe of a third rail circuit is in contact with any section of an energized third rail, from which the motors of the vehicles or electromotive engines receive current for operating their motors, the solenoid core C, maintains the position illustrated in Figs. 3, and 4, and the travel of the car or electromotive engine is maintained, but when the trolley wheel or shoe of either an overhead wire or third rail railway comes into contact with a section of the conductor which is dead or deënergized, such as the section marked X', in Fig. 1, then the current through the coil of the solenoid E, ceases, and as at that instant the soft iron core C, also ceases to be pulled upward, the soft iron core, the rod D, and piston B, are at the same instant forced downward by the pressure of the air in the pipe F, acting directly from the compressed air reservoir G, upon the upper end of the piston B, thereby causing the piston B, to be moved far enough within the cylinder A, until the port H, of the exhaust pipe I, leading out of the cylinder A, is closed by the passage of the lower part of the head of the piston B, slightly beyond the lower edge of the port H, and having at the same time moved the piston B, sufficiently far to open the port H', of the by-pass K, around the piston B, which by-pass K, opens at the place marked J', into the pipe J, leading to the air brake cylinders Q, Q, thereby causing the piston or pistons within each air brake cylinder Q, to be moved sufficiently to apply the brakes to the wheels of an electrical railway car or electromotive engine, until the said car or electromotive engine is altogether stopped. When the port H', in the cylinder A, leading from above the upper and smaller end of the piston B, is opened, to the upper part of the cylinder A, by the movement of the piston B, then the compressed air passes through the passage K, shown in Fig. 4, into the opposite end of the cylinder A, by the port L, Fig. 4, so that the compressed air in the apparatus then acts upon the upper and lower ends of the piston B. A stop M, is provided as part of the cover N, of the lower end of the cylinder A, against which the lower end of the piston B, abuts, when it has descended to its lowest point. This stop is of such height within the cylinder A, that while it admits of all the motions requisite in the piston B, to perform the functions herein described, yet it never allows the soft iron core C, to move wholly out of the solenoid coil E. So soon as the cylinder or cylinders Q, of the air brake has, or have, been charged with compressed air from the pipe J, which is often of less pressure than the pressure of air led from the compressed air reservoir by the pipe F, into the cylinder A, then the pressure of air conveyed to the air brake cylinder by the pipe J, remains constant so long as the brake or brakes is, or are on, or applied to the wheels of a railway car or electromotive engine, but when the section of conductor X', with which the trolley wheel of the overhead wire or third rail circuit is in contact is reënergized, then the soft iron core C, is again drawn up into the solenoid coil E, and the position of the several parts when so drawn upward is as illustrated at Fig. 3, at which instant the compressed air is also released from the brake cylinders Q, Q, through the pipe W, Figs. 2, and 3, and thence through the annular space S, into the exhaust pipe I, into the atmosphere, while the apparatus remains charged with compressed air from the pipe F, leading from the reservoir G, into the upper part of the cylinder A, above the piston B, as hereinbefore described, and the permanence of compressed air in this part of the cylinder A, above the piston B, is a feature of my said invention.

The exhaust air liberated by the hand operated valves R, R, at either end of a car operated by the motorneer is led as shown at Fig. 2, through the central part of the cylinder A, into the annular space between the two sets of packing rings O, and P, and this space is open to the atmosphere when the piston B, is held in the inoperative condition by the soft iron core C, and the solenoid coil E, as hereinbefore described. The valves R, and the arrangement of pipes shown in Fig. 2, do not constitute any part of my present invention. The instant when the motors of a car, or electromotive engine cease to be energized by the action of interrupting devices, the solenoid coil E, ceases to receive current, and its soft iron core C, is no longer magnetized, while the pressure of the air in the cylinder A, above the piston B, simultaneously operates to produce the results hereinbefore described. The instant when the pressure in the brake cylinder or cylinders reaches, or reach, the amount necessary to bring the car, or electromotive engine to a gradual stop it will be seen that the compressed air acts to force the piston B, back in the opposite direction and to close the port H', leading to the pipe J, which admits air to the brake cylinder or cylinders. With this arrangement the car or electromotive engine will not stop with a jerk but be gradually stopped just as if the motorneer were turning on the air slowly by hand. In other words, the piston B, acts as a balance valve between the air reservoir and the brake cylinder, or cylinders, and by varying the area of the larger end of the piston B, to any desired amount, pressure less than the pressure in the reservoir G, can be attained, and maintained in the brake cylinder or cylinders.

The brake pressure used with my device is about the same as that used under ordinary conditions when the air pressure is operated by a hand operated valve on a car or electromotive engine, to which an air brake is applied.

After a car, or electromotive engine has been arrested or stopped in the manner hereinbefore described, the brakes will remain "set", that is to say, applied to the wheels of the car or electromotive engine, until the section of trolley wire or third rail X′, which has been deënergized, has again been energized or made alive by the closing of either of the interrupters described in the specifications of my aforesaid applications for Letters Patent, and at the moment such sections of overhead wire or third rail become again excited or rendered alive, the solenoid of the air controller becomes excited and then the soft iron core C, pulls the piston B, into the position which renders the controller inoperative by closing the port H′, which leads to the pipe or passage J, leading to the brake cylinder or cylinders. The motorneer can then exhaust the air from the brake cylinder or cylinders by either of the ordinarily used hand operated valves R, with which compressed air brake apparatus is always provided, and in thus relieving the brake shoes from pressing upon the wheels of a car, or electromotive engine, leaves the car or electromotive engine free to proceed on its railway journey, this apparatus consisting of a valve R, operated by a motorneer, is in common use and therefore not constituting any part of my present invention, is not herein described.

I claim as my invention.

The apparatus for maintaining compressed air brakes out of action upon the wheels of a railway car and electromotive engine when running upon a railway track, and for causing brakes to be applied when the trolley wheel or shoe of a continuous current electrical railway engages with any portion or section of the overhead wire or third rail conductor which has become deënergized, the said apparatus consisting of a solenoid coil excited directly by and from the main conductor of a continuous current electrically operated railway, the soft iron core of the solenoid connected directly to a piston operating in a cylinder, said cylinder having a port connected by a pipe to a compressed air reservoir, another port and pipe connecting it to the cylinders of air brake mechanism, a port connected with an annular space surrounding an intermediate part of the piston, into which space also the exhaust pipe from a hand operated valve enters, the ports and passage enabling the compressed air to operate upon both ends of the piston and maintaining the air in the brake cylinders at the pressure requisite to put on and maintain the brakes in operative relationship to the wheels of a car, vehicle, and electromotive engine, until the brakes are released by the reëxcitation of the solenoid coil, so that the piston is returned to its normal position in the cylinder by the action of the solenoid when again excited, all the parts of the apparatus being then ready for being again operated when the trolley wheel, or shoe, of the main conductor engages with a deënergized section of the main conductor, substantially as hereinbefore described.

In testimony whereof, I have hereunto set my hand and seal at the city of Los Angeles aforesaid, in the presence of two subscribing witnesses.

JACOB MICHAEL LONG. [L. S.]

Witnesses:
 ST. JOHN DAY,
 IDA M. DASKAM.